(12) United States Patent
Tremoureux et al.

(10) Patent No.: US 8,428,767 B2
(45) Date of Patent: Apr. 23, 2013

(54) METHOD FOR CUTTING OUT A PANOPLY OF PARTS

(75) Inventors: Laurent Tremoureux, Saint-Nazaire (FR); Jean-Christophe Hamann, La Baule (FR)

(73) Assignee: Airbus Operations SAS, Toulouse (FR)

( * ) Notice: Subject to any disclaimer, the term of this patent is extended or adjusted under 35 U.S.C. 154(b) by 581 days.

(21) Appl. No.: 12/161,236

(22) PCT Filed: Jan. 22, 2007

(86) PCT No.: PCT/EP2007/050619
§ 371 (c)(1),
(2), (4) Date: May 24, 2010

(87) PCT Pub. No.: WO2007/085584
PCT Pub. Date: Aug. 2, 2007

(65) Prior Publication Data
US 2010/0268373 A1    Oct. 21, 2010

(30) Foreign Application Priority Data
Jan. 27, 2006   (FR) ...................... 06 50288

(51) Int. Cl.
*G06F 19/00* (2011.01)

(52) U.S. Cl.
USPC ............ 700/187; 700/171; 700/32; 700/134; 700/135

(58) Field of Classification Search .................. 700/171, 700/134, 135
See application file for complete search history.

(56) References Cited

U.S. PATENT DOCUMENTS

| | | | | |
|---|---|---|---|---|
| 3,242,573 A | * | 3/1966 | Noel | 33/1 G |
| 3,596,068 A | * | 7/1971 | Doyle | 700/135 |
| 3,864,997 A | * | 2/1975 | Pearl et al. | 83/49 |
| 3,875,389 A | * | 4/1975 | McFadden et al. | 700/171 |
| 4,327,615 A | * | 5/1982 | Gerber et al. | 83/49 |
| 4,551,810 A | * | 11/1985 | Levine | 700/182 |
| 4,554,635 A | * | 11/1985 | Levine | 700/183 |

(Continued)

FOREIGN PATENT DOCUMENTS

WO   0104805 A   1/2001

OTHER PUBLICATIONS

Sam Anand, Christopher McCord, Rohit Sharma; "An Integrated Machine Vision Based System for Solving the Non-Convext Cutting Stock Problem Using Genetic Algorithms"; Journal of Manufacturing Systems; vol. 18, No. 6; 1999; pp. 396-415.*

(Continued)

*Primary Examiner* — Jeffrey A Gaffin
*Assistant Examiner* — Christopher E Everett
(74) *Attorney, Agent, or Firm* — Perman & Green, LLP

(57) ABSTRACT

A method for cutting out a panoply of parts. This cutting-out method includes producing data relating to points defining the contour of each part and to the position of each part in a Cartesian frame of reference of the panoply, grouping the parts together into at least one subset, each subset embodied by a box being considered as a single part; grouping the subsets into at least one set, each set embodied by a box being considered as a single part; establishing an order in which to cut out the parts from the subsets and sets defined respectively a cutting-out step in which the cutting-out tool moves from part to part in the cutting-out order.

13 Claims, 5 Drawing Sheets

U.S. PATENT DOCUMENTS

| | | | | | |
|---|---|---|---|---|---|
| 5,214,590 | A | * | 5/1993 | Schnetzer | 700/171 |
| 5,662,566 | A | * | 9/1997 | Marxrieser et al. | 483/1 |
| 5,703,781 | A | * | 12/1997 | Martell et al. | 700/135 |
| 5,815,398 | A | * | 9/1998 | Dighe et al. | 700/217 |
| 6,192,777 | B1 | * | 2/2001 | Williams et al. | 83/56 |
| 6,434,444 | B2 | * | 8/2002 | Herman, Jr. | 700/135 |
| 6,690,990 | B1 | * | 2/2004 | Caron et al. | 700/171 |
| 6,898,478 | B2 | * | 5/2005 | Dick et al. | 700/171 |
| 6,980,934 | B1 | * | 12/2005 | Sadovnik | 703/1 |
| 7,277,768 | B2 | * | 10/2007 | Dash et al. | 700/97 |
| 7,469,620 | B2 | * | 12/2008 | Fagan | 83/13 |
| 2002/0092389 | A1 | | 7/2002 | Feldman et al. | |
| 2003/0114952 | A1 | * | 6/2003 | Scott | 700/171 |
| 2006/0064198 | A1 | * | 3/2006 | Fithian et al. | 700/187 |
| 2006/0080820 | A1 | * | 4/2006 | Belote | 29/407.05 |
| 2009/0108792 | A1 | * | 4/2009 | Fagan | 318/568.1 |

OTHER PUBLICATIONS

Adamowicz, Michael; Albano, Antonio; , "A Solution of the Rectangular Cutting-Stock Problem," Systems, Man and Cybernetics, IEEE Transactions on , vol. SMC-6, No. 4, pp. 302-310, Apr. 1976.*

Roussel, G.; Maouche, S.; , "Improvements about automatic lay-panning for irregular shapes on plain fabric," Systems, Man and Cybernetics, 1993. 'Systems Engineering in the Service of Humans', Conference Proceedings., International Conference on , vol., No., pp. 90-97 vol. 3, Oct. 17-20, 1993.*

International Search Report dated Apr. 11, 2007, for PCT/EP2007/050619.

* cited by examiner

METHOD FOR CUTTING OUT A PANOPLY OF PARTS

CROSS REFERENCE TO RELATED APPLICATIONS

This application is the National Stage of International Application No. PCT/EP2007/050619, International Filing Date, 22 Jan. 2007, which designated the United States of America, and which International Application was published under PCT Article 21 (2) as WO Publication No. WO2007/085584 and which claims priority from French Application No. 0650288, filed on 27 Jan. 2006, the disclosures of which are incorporated herein by reference in their entireties.

BACKGROUND

The disclosed embodiments relate to a method of cutting out a panoply of parts. The method enables one to automatically and optimally determine a cutting order for the parts.

The disclosed embodiments are applicable in the area of technology of fabrication of industrial parts, particularly in the aeronautics industry, in instances where the parts to be produced have different sizes and shapes, and the panoplies of parts may be defined in response to time-variant needs, in a manufacturing organization employing "just in time" scheduling which necessitates time efficiencies as well as economic efficiencies.

Under current concepts, in fabricating parts having regular or irregular shapes, by means of bending, stamping, or deep drawing, one first cuts out blanks corresponding to the parts, from a plate or plates, typically comprised of a metal alloy, a plastic, or a composite. The situation often presents itself where it is desired to cut out a number of blanks of very different shapes from a single plate or stack of plates. Hereinafter, the term "part" will be understood to mean a blank intended to be used for fabrication of a part.

The term "interlacing" (in French, "imbrication") is used to designate a process of establishment of an arrangement of parts with respect to each other starting with their geometric data, with consideration of the path (progression) of the cutting tool to be used, with aim of optimizing the ratio between the area of the parts and the area of the plate, so as to reduce the amount of scrap.

The term "panoply of parts" is used to designate the totality of parts positioned on a given plate.

At the conclusion of the "interlacing" process, each part is represented by an outline (or "box") which surrounds it, particularly the center point of its outline, and by its orientation in the set of coordinates adopted for the panoply; and each part is associated with a fabrication path.

Before each cutting-out operation, it is necessary to determine an order of cutting out of the parts in the panoply, wherewith each part is assigned a number, and the cutting order is input into a program associated with the control system of the cutting apparatus. The cutting tool guided by this control system cuts out the parts in conformance with this established cutting order.

In current practice, this step of establishing the cutting order is performed manually by an experienced preparer.

The establishment of the cutting order is a very important step in the process, because it governs the path of the tool during the cutting. It has an appreciable influence on the accuracy of the cutting, thus on the quality of the parts and on the yield and efficiency of the cutting operation. As the cutting out of the panoply progresses, the parts which have been cut out are no longer attached to the panoply, wherewith zones without material (voids) are left in the plate, giving rise to "skeleton" regions. Prior to being cut out, parts are disposed near such void-containing zones, exposing them to unstable situations, in that they receive reduced support from the material. This "instability" during cutting causes reduced cutting accuracy, which may detract from the quality of the parts. The cutting order is particularly critical if the plate is not well held on the table of the cutting apparatus, and particularly in the case of a stack of plates. At the same time, cutting of a stack of plates with minimum holding is a process which offers maximum flexibility and is thus well suited for use in "just in time" fabrication schemes. It is fundamentally important that the preparer be able to provide a judicious choice of the cutting order in order to meet the criteria of success in the fabrication of the ultimate parts.

If the cutting order is not correctly established, disadvantageous or even dangerous shifting may occur which can adversely affect the quality of the parts cut out.

Another technical drawback of manual establishment of the cutting order is the time which the preparer consumes in the task of establishing the order. In the "just in time" production environment of the aeronautics manufacturing industry, the composition of a panoply of parts will depend on current needs (which may vary); a given panoply will not be identical to the prior one. The preparer must perform a new optimization each time the configuration of the panoply changes.

SUMMARY

To solve these problems, the disclosed embodiments propose a method of cutting out of parts which is simple and reliable, which method comprises a step of automatic establishment of the cutting order based on a simplified topography of the panoply, which step is then directly integrated into a cutting program of the cutting apparatus.

A first aspect of the disclosed embodiments is to fabricate parts having a superior quality, while improving the efficiency and efficacy of the cutting process.

A second aspect of the disclosed embodiments is to avoid the risk of error inherent in manual methods of devising a cutting scheme (cutting order etc.), and to provide a method of establishing the cutting order which adaptable to semi-automatic or automatic means. The formulation of this cutting scheme for a panoply having a given configuration (given topography) is determined by the scalar parameters which allow one to reproduce the behavior of an experienced preparer.

Accordingly, the disclosed embodiments provide a method of cutting out a panoply of parts, said cutting out being realized by means of a cutting tool operating on a plate or a stack of plates held on at least one of its sides by a line of workholders, the movement of said cutting tool being guided by a control system.

The inventive method proposed is comprised of the following steps:
  (a) a step of generation of data concerning the points which define the contour of each part and the positioning of each part in the set of cartesian coordinates (X, Y) of the panoply;
  (b) a first grouping step of grouping of parts into at least one subset, wherein each subset characterized by a particular outline (e.g. box) is treated as a single part;
  (c) a second grouping step of grouping of the described subsets into at least one set, wherein each set characterized by a particular outline (e.g. box) is treated as a single part;

(d) a step of establishment of an order of progression of cutting out of the parts from the subsets and sets defined in steps (b) and (c), respectively;

(e) a cutting step in which the cutting tool is moved from part to part in accordance with the aforesaid order of progression of cutting out established in step (d).

The disclosed embodiments also concern various characteristics which will be apparent in the course of the following description, and which will suggest various possible embodiments; these characteristics should be regarded individually and in all their possible technical combinations.

Preferably, in step (b), each subset is defined based on a "principal part" from which "principal part" a "covering zone" is defined, and the parts associated with or disposed in the said "covering zone" according to the criterion of a "covering index", $\beta$, are deemed members of said subset.

Preferably, in step (c), each set is defined based on a "principal subset" from which "principal subset" a projection zone is defined, and the subsets associated with or disposed in the said projection zone according to the criterion of a "superposition index", super-$\beta$, are deemed members of said set.

The grouping step (b), wherein the parts are grouped into subsets, comprises the following:
- a first phase of identification of the aforesaid at least one "principal part";
- for each "principal part", defining a "covering zone" based on a so-called "lighting direction"; and
- a third phase of identification of the parts deemed to be associated with or disposed in said "covering zone" according to the criterion of a "covering index", $\beta$, having a value between 0 and 1.

The grouping step (c), wherein the subsets are grouped into sets, comprises the following:
- a first phase of identification of the aforesaid at least one "principal subset";
- identifying a projection zone for each "principal subset", on one of the two axes of the coordinate system of the given panoply of parts;
- a second phase of identification of the subsets which have a projection superposed on or coinciding to some extent with said projection zone, according to the criterion of a "superposition index", super-$\beta$, having a value between 0 and 1.

The disclosed embodiments will be described in more detail hereinbelow, with reference to the accompanying drawings.

DETAILED DESCRIPTION

Figure 1:
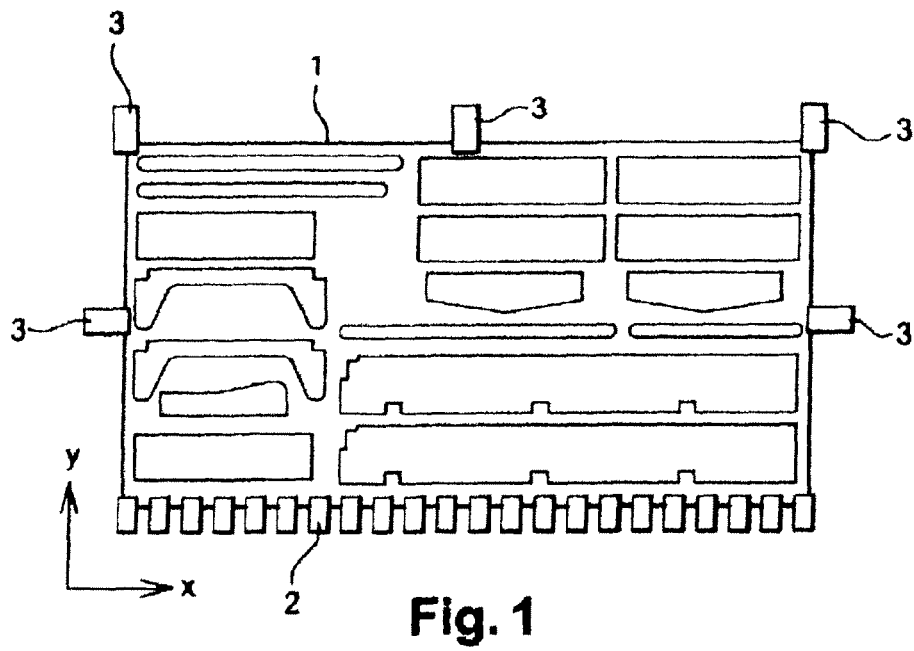
FIG. 1 is a schematic depiction of a panoply of parts arranged in a distinct but efficient ("interlacing") manner with respect to each other, with the lower side of the panoply being held by a line of workholders, and the other sides being held solely at the middle and at the corners, wherewith the positions of the parts are indicated with reference to a set of cartesian coordinates (X, Y) of the panoply.

FIG. 1 illustrates an example of a panoply 1 of parts of different shapes and sizes which have been arranged in an efficient interlacing manner. The position of each part is indicated with reference to a set of cartesian coordinates (X, Y) of the given panoply, the origin of said coordinates being at the lower left corner of the panoply. The X axis is assigned to the longest side of the panoply. During the process of cutting out the parts, the plate or stack of plates subjected to the cutting is held at its lower side by a line of workholders 2, and at its other sides by clamping arms 3 at the middle and corners of each side.

In all of the examples presented here, the order of cutting is subject to the following rules, which are somewhat empirical and depend on the process as well as on the holding of the plate(s):

- The cutting should terminate in a zone where the maximum amount of plate material remains;
- The last surface cut should be well held, and should not be oriented toward the "skeleton side" for example, a side where parts have already been cut out;
- The starting point and end point of a cut should preferably be disposed at the small ends of parts, where the fragments are the least encumbering. In the examples presented here, a cut of a part should begin at the lower left corner of the part;
- The general progression of cuts in the X direction should be toward decreasing X dimension, also referred to as a negative X direction;
- A cut of a given panoply of parts should terminate along a side having a line of workholders, and accordingly in the configurations of panoplies of parts illustrated here the progression of cuts in the Y direction should be toward decreasing Y dimension, also referred to as a negative Y direction;
- The cut should be realized such that a lateralmost part is cut last.

The purpose of the disclosed embodiments is to reproduce those principles used by engineers who define the order of cutting based on experience, taking into account rules for cutting so as to automatically determine the optimal order of cutting of the desired parts. The principle of the method according to the disclosed embodiments is based on certain "weighting factors" which relate to physical parameters of the geometry of the panoply of parts, which parameters can be adjusted depending on the "topographic type" of the given panoply of parts.

The aforesaid "weighting factors" are intended to aid in arriving at a successful scheme for grouping the parts into subsets and sets. Thereafter, the order of cutting is determined by considering these subsets and sets.

Advantageously, the step of grouping the parts into subsets and the step of grouping the subsets into sets are elements of a process involving iterations which enables discretization of the topography of the panoply of parts at various levels. The step of grouping the parts into subsets and the step of grouping the subsets into sets comprise the first two "levels" of the iterative process.

In a first step of the process, data are generated concerning the points which define the contour of each part and the positioning of each part in the set of cartesian coordinates (X, Y) of the panoply.

This step provides means of establishing the topography of the panoply, namely by analyzing the profile of the contour of each part of which the panoply of parts is comprised, and by representing the position of said part within the overall reference points or coordinates (X, Y) of the panoply of parts.

These data comprise the coordinates of points which define the contour of each part in the set of cartesian coordinates (X, Y) of the panoply.

Figure 2A:
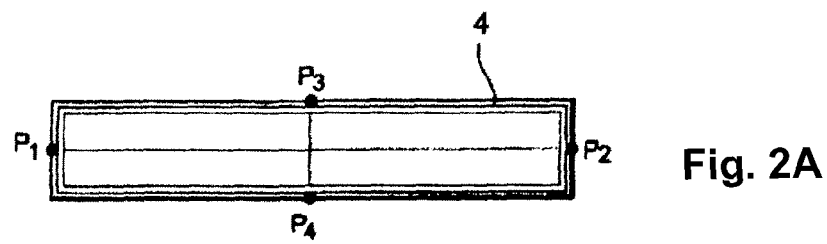
FIG. 2A illustrates a particular part in the form of a rectangle.
Figure 2B:
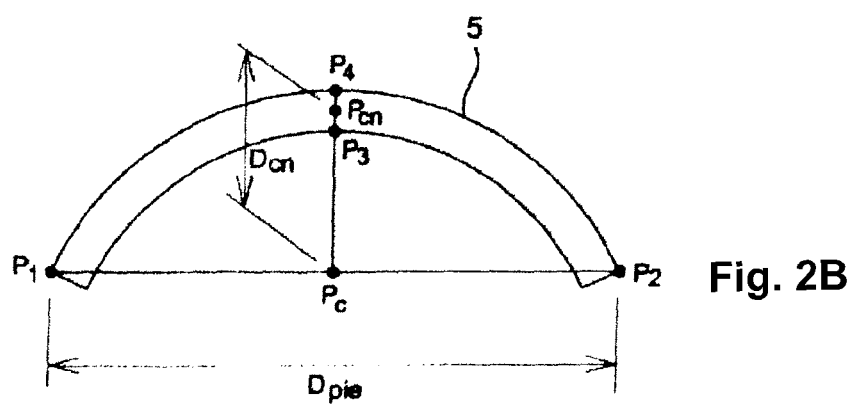
FIG. 2B illustrates a second part in the form of an arc.

Starting with these coordinates, one defines two "shape categories" of the shapes of the parts, namely a rectangular "shape category" (e.g. 4) and an arcuate "shape category" (e.g. 5) (FIG. 2B).

Each part may be economically defined by four points (P1, P2, P3, P4). The set of the four defining points of all the parts gives a complete description (definition) of the panoply of parts.

FIGS. 2A and 2B illustrate the two "shape categories" characterizing the contour of the parts, wherewith one of the parts, 4, has a rectangular shape and the other part, 5, has an arcuate shape. The points (P1, P2, P3, P4) which are the defining points of the part 4 are disposed at the midpoints of the respective four sides of the rectangle. The convention for numbering is that the first point P1 should be the point closest to the reference point or point of origin in the coordinate system of the panoply of parts, and the other defining points (P2, P3, P4) are arrived at by progressing clockwise around the given part. For the part 5, and as a general proposition for a part of arbitrary shape, the defining points P1 and P2 are the two maximally separated points on the contour of the part, and the points P3 and P4 are intersection points of the contour with a straight line which extends perpendicularly from the midpoint of the segment P1-P2. In the description hereinbelow, all parts are designated as either rectangular or arcuate, depending on the shape of their contour.

Two rules are necessary to differentiate rectangular parts, that is, parts in the rectangular "shape category" from arcuate parts, that is, parts in the arcuate "shape category". The first rule relates to the position of the points P3 and P4 relative to the straight line P1-P2. A part is categorized as "rectangular" if the points P3 and P4 are disposed on opposite sides of the line P1-P2. The second rule for categorizing the shape of the contour of a part is the concavity parameter, $\gamma$. Based on the four points (P1, P2, P3, P4), the points Pc and Pcn are determined, Pc being the midpoint of the segment P1-P2, and Pcn being the midpoint of the segment P3-P4 (FIG. 2B). A part is considered "arcuate" if it is arcuate according to the first rule and in addition:

$$\gamma Dpie >/= Dcn,$$

where Dpie is the distance between points P1 and P2; Dcn is the distance between points Pc and Pcn; and $\gamma$ is the concavity parameter, the value of which remains to be fixed, in the range between 0 and 1.

According to the inventive method, the second step comprises grouping the parts into subsets.

This step of grouping the parts into subsets has two phases, the first of which comprises identifying the "principal parts", from which one defines for each "principal part" a "covering zone"; and the second of which phases comprises identifying each part found in the said "covering zone", based on a weighting factor, B, which is a "covering index".

Figure 3:
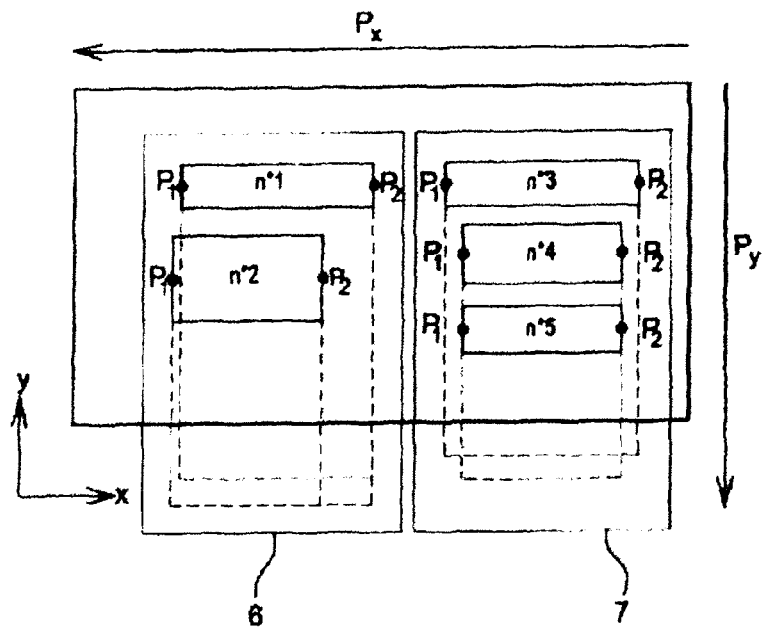
FIG. 3 is a schematic illustration of a "covering zone" which may overlap other "covering zones", defined by a principal rectangular part.

The "covering zone" can be assimilated in a "shadow zone" according to a prescribed "lighting direction". All of the subsets are established from considerations of a "lighting direction" along an axis perpendicular to the global axis of progression of the cutting. In all of the examples presented here, the general progression from part to part is defined along the X axis, corresponding to the longer side of the plate. Consequently, the subsets are established along a "lighting direction" along the Y axis. FIG. 3 illustrates this principle, with the subsets being cut in a progression Px, here shown in the decreasing X direction. The parts in each set are cut in a direction Py, shown in the decreasing Y direction.

The "principal part" is established based on two criteria:
- The "principal part" should have the longest possible X-axis dimension, such as to define the maximum possible "covering zone" for maximum grouping of parts;
- The "principal part" is always above the other parts in the subset, with respect to the decreasing Y direction; it is the part having the largest Y-coordinate in the coordinate system of the panoply of parts, with the "covering zone" being defined from the top downward in the panoply.

In the case where the "principal part" is a rectangular part, the "covering zone" is defined based on the following rules: The points from the projection of the segments P1-P2 of the parts belonging to the set defined by the rectangular part, and the points from the projection of the segment P1-P2 of the "principal part", are combined, with a "covering index" $\beta$. The value of the parameter $\beta$ is in the range 0 to 1, and is the same for all of the subsets of a given panoply of parts.

FIG. 3 illustrates the case of two "rectangular subsets", with two examples having a fixed "covering index" $\beta=0.65$. The first subset, 6, has two rectangular parts (no. 1, no. 2). Part no. 1 is identified as the "principal part". Part no. 2 is disposed below the "principal part". The points of projection of its segment P1-P2 on the X-axis and those of the "principal part" coincide to the extent of greater than 65%. The parts no. 1 and no. 2 form a subset. The second example of a rectangular subset is comprised of three parts (no. 3, no. 4, no. 5). The "principal part" is part no. 3, and parts no. 4 and no. 5 are identified as parts disposed in the interior of the "covering zone" defined by part no. 3. In this example, all of the points in the projection of the segments P1-P2 of the two parts (no. 4, no. 5) coincide 100% with those of part no. 3.

Figure 4:
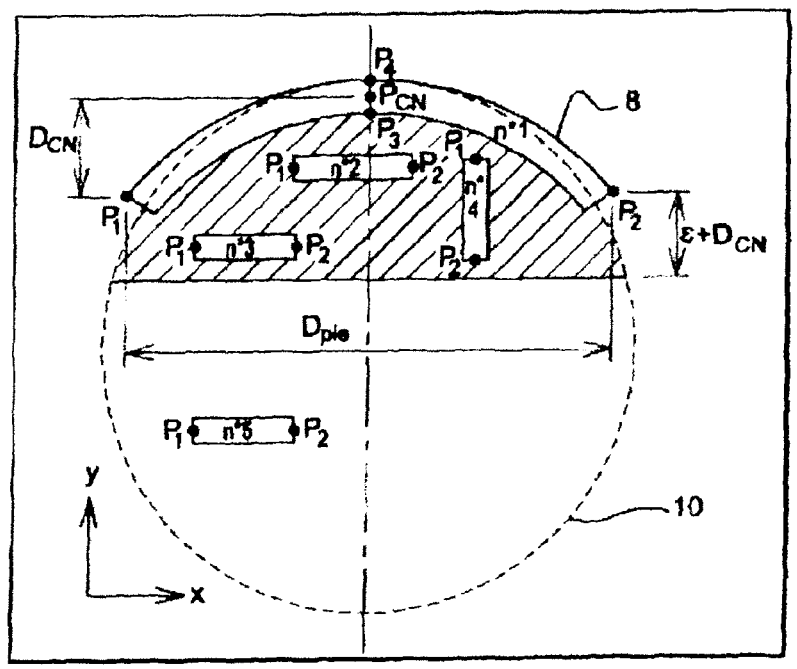
FIG. 4 is a schematic illustration of a "covering zone" which may overlap other "covering zones", defined by a principal arcuate part.

FIG. 4 illustrates the case of an "arcuate subset", 8, wherein the "principal part", part no. 1, is arcuate. The "covering zone" of this part is limited by a line 9 which separates the "covering zone" from the exterior. This line 9 is parallel to the line passing through the two points (P1, P2) of the arcuate "principal part" and disposed at a distance:

$$\epsilon \times Dcn$$

from said line P1-P2,
where Dcn is the above-defined "concavity" of the part, and
$\epsilon$ is a factor which allows variation of the area of the "covering zone" by varying the distance $\epsilon \times Dcn$.

The described "covering zone" is also limited by the circle 10 which passes through the points P1, P4, and P2, having center O and radius R which radius is the distance between O and the point P4 of the arcuate part.

By combining the two limits, the "covering zone" for the parts is the area between the circle 10 having center O and radius R, the line 9, and the arcuate part no. 1, which zone is indicated by shading (parallel inclined lines) in FIG. 4.

Parts no. 2, no. 3, and no. 4 disposed in this shaded area thus belong to the subset formed by the arcuate part. Part no. 5 is outside this "covering zone", and is not a member of this subset.

Figure 5:
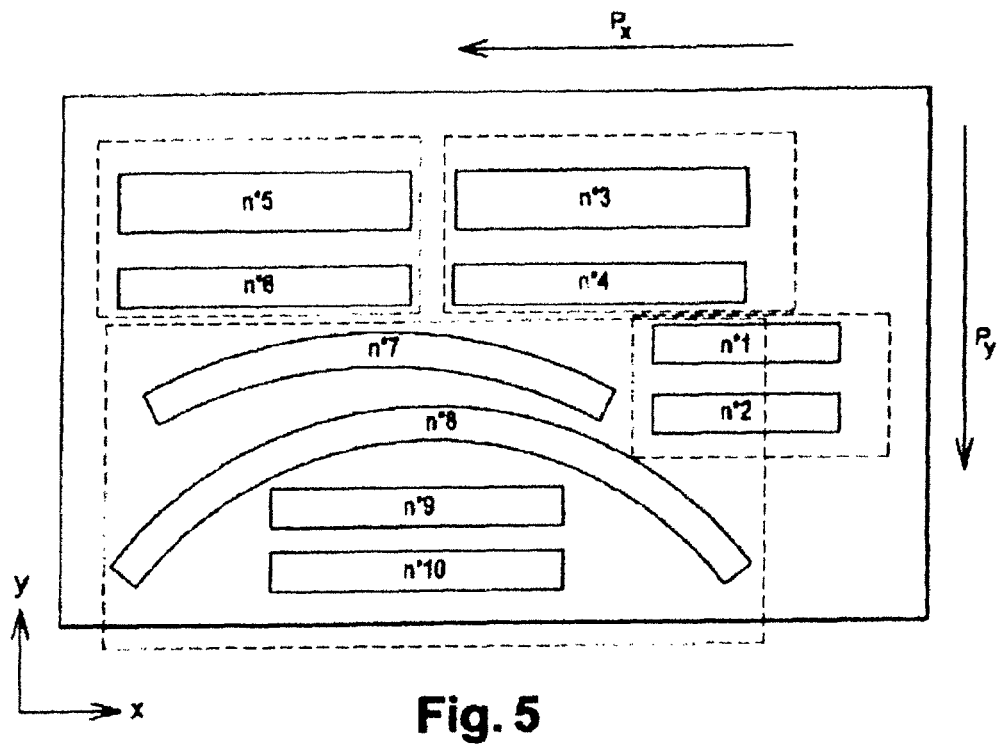
FIG. 5 is an illustration of a panoply of parts comprised of four subsets.

FIG. 5 illustrates an example of four subsets, with the first of these being comprised of parts no. 1 and no. 2. Parts no. 3 and no. 4 comprise the second subset, and parts no. 5 and no. 6 comprise a fourth subset. The final subset is comprised of four parts (no. 7, no. 8, no. 9, no. 10) of which no. 7 is the "principal part". Each of these subsets is defined by an outline; the subset formed is treated as a single part.

The described first stage of grouping allows simplification of the topography of the panoply, and constitutes a first level of discretization of the topography of the panoply.

Figure 6:
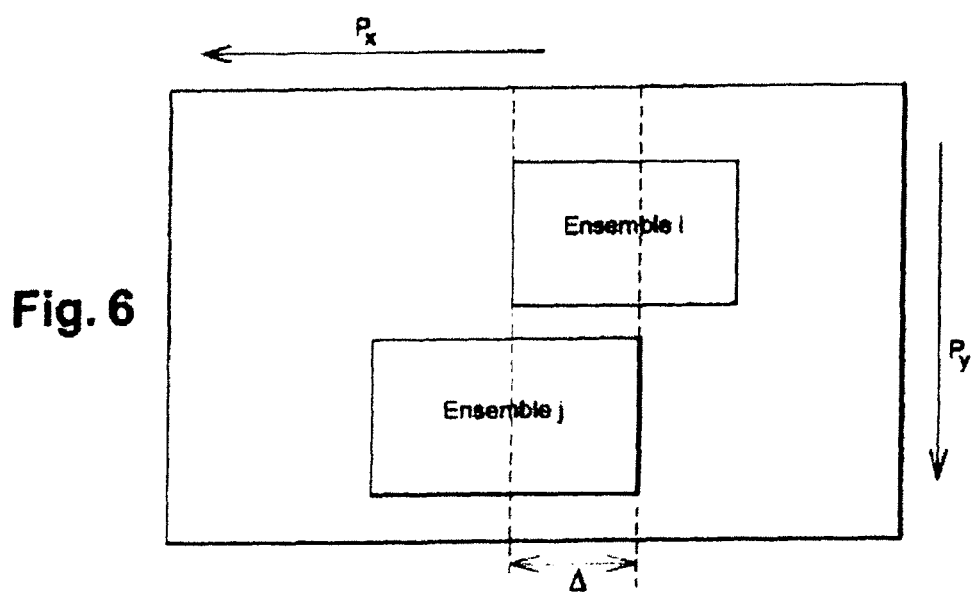
FIG. 6 illustrates an example of an overlapping zone between two subsets in this example represented schematically by two rectangles.

After all of the parts have been grouped into subsets in the said first stage, the following second stage consists of grouping the subsets (now themselves treated as parts) into sets. FIG. 6 illustrates two subsets (i, j), with the "principal subset" being subset i. Subset j will be deemed associated with (i.e. will be deemed to belong to) subset i if the projection of subset j on the X axis coincides with the projection of subset i on the X axis with a "covering index" super-$\beta$ (hereinafter, "superposition index"), i.e. where the criterion is satisfied that the zone of coincidence $\Delta$ of the length of the outline surrounding subset i and the length of the outline surrounding subset j has a proportion which is equal to or greater than super-$\beta$. The value of super-$\beta$ is in the range 0 to 1.

Figure 7A:
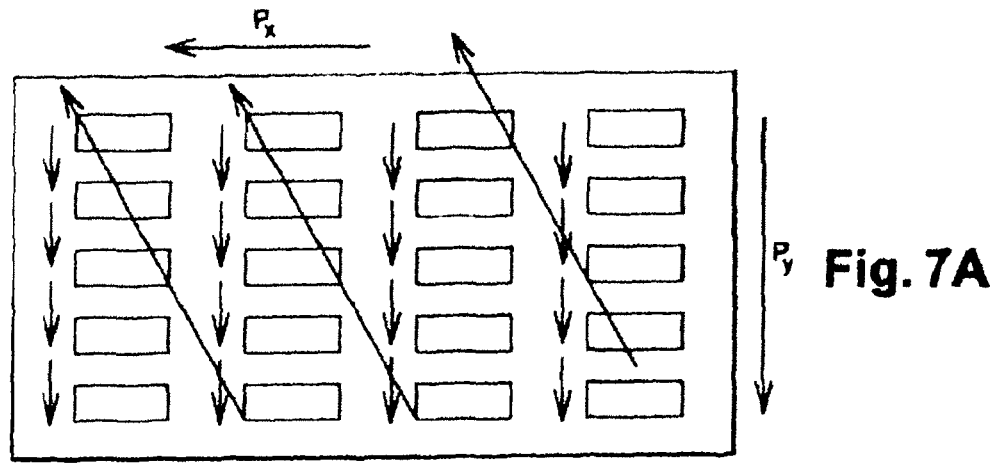
FIG. 7A illustrates schematically an example of a panoply of parts comprising a "cutting configuration" arranged in columns, where "super-$\beta$" is equal to 1.

If the parameter super-$\beta$ equals 1, the panoply is comprised solely of subsets. The optimal cutting order is determined by these subsets. This case is illustrated in FIG. 7A, where the parts are grouped into subsets by columns. The cutting order of the parts in this case is defined by the cutting order from column to column in the direction of decreasing X-direction value, that is, a negative X direction. In each column, the parts are cut in order of decreasing Y-direction value, that is a negative Y direction. These progressions are represented by the arrows in FIG. 7A.

If the parameter super-$\beta$ equals 0, the entire panoply may be deemed to comprise a single set. This second extreme case is illustrated in FIG. 7B, where the parts are cut in layers or rows, with the progressions represented by the arrows in FIG. 7B.

Advantageously this parameter, super-$\beta$, is a weighting factor, which allows cutting by columns or by rows, or a combination of these two modes of progression; thus, super-$\beta$ serves as a determining factor in establishing the cutting order of a panoply of parts.

In general, the value of the parameter super-$\beta$ is selected as a function of the geometry of the parts, their mutual arrangements in the panoply, and cutting rules which may be influenced by the type of the cutting process and the means of holding of the plate or stack of plates.

Figure 7B:
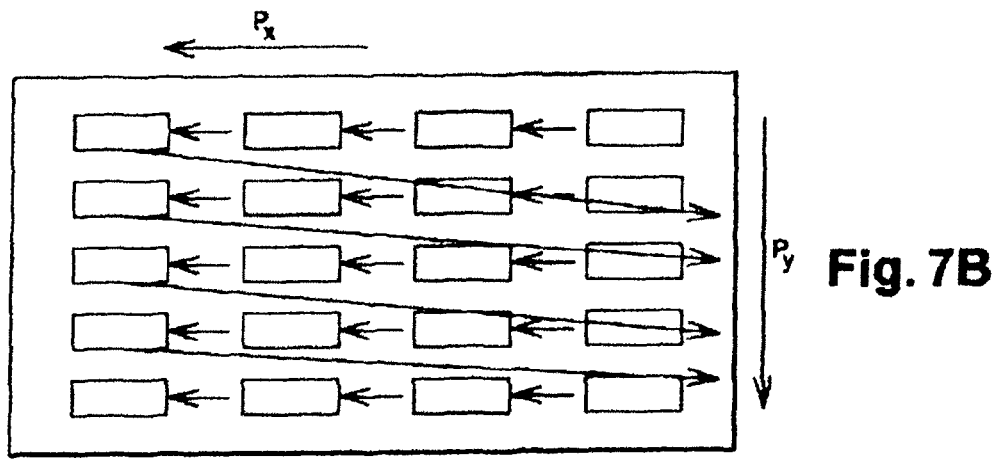
FIG. 7B illustrates schematically an example of a panoply of parts comprising a "cutting configuration" arranged in rows, where "super-$\beta$" is equal to 0.
Figure 8:
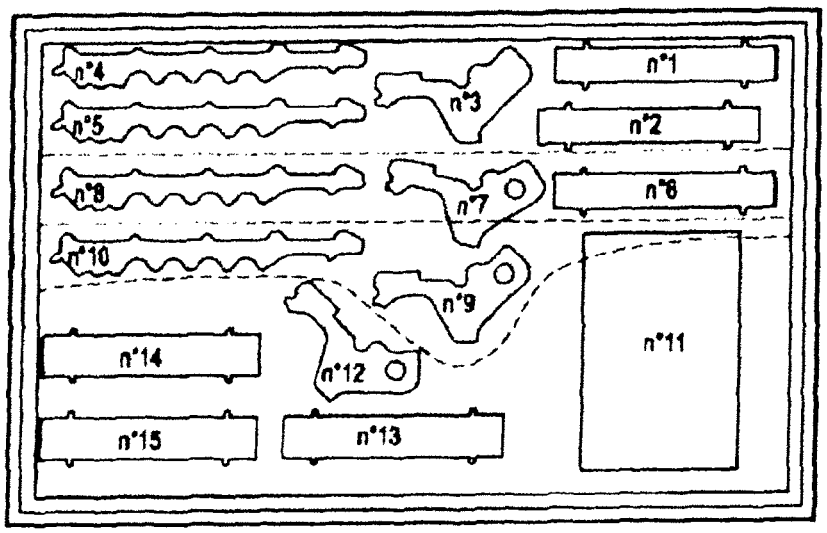
FIG. 8 illustrates an example of parts in a set, with the parts arranged such that they will be cut out in "single rows" or in "double rows"

In general the rows tend to be simple or single rows, wherewith each row comprises a single linearly arranged succession of parts (such as in FIG. 7B). According to an alternate embodiment, a given row may be a double row comprised of two closely spaced lines or linearly arranged successions of parts. This case is illustrated in FIG. 8, where the entire panoply is deemed to comprise a single set, thus having a super-$\beta$=0. This set is comprised of four rows: the first row is comprised of parts nos. 1 to 5, the second row is comprised of parts nos. 6 to 8, the third row is comprised of parts nos. 9 and 10, and the fourth row is comprised of parts nos. 11 to 15. In the first row, parts no. 2 and no. 5 are disposed below parts no. 1 and no. 4, respectively, and form a second line of parts below the top line. In the bottom row, parts no. 13 and no. 15 form a second line of parts below the line of parts formed by parts no. 12 and no. 14. The top and bottom rows are examples of double rows.

The cutting process has a supplementary stage, consisting of identifying elongated parts which are disposed generally vertically in the panoply (along the Y axis). A part is identified as "vertical" if its points P1 and P2 are disposed vertically in the panoply, wherewith the projection on the Y axis of the segment P1-P2 should be at least two times greater than the projection of the segment P3-P4 on the X axis. Parts identified as "vertical" may not permissibly belong to a subset; rather, each constitutes a "vertical subset"; vertical subsets may be in turn grouped into a "vertical set".

Figure 9:
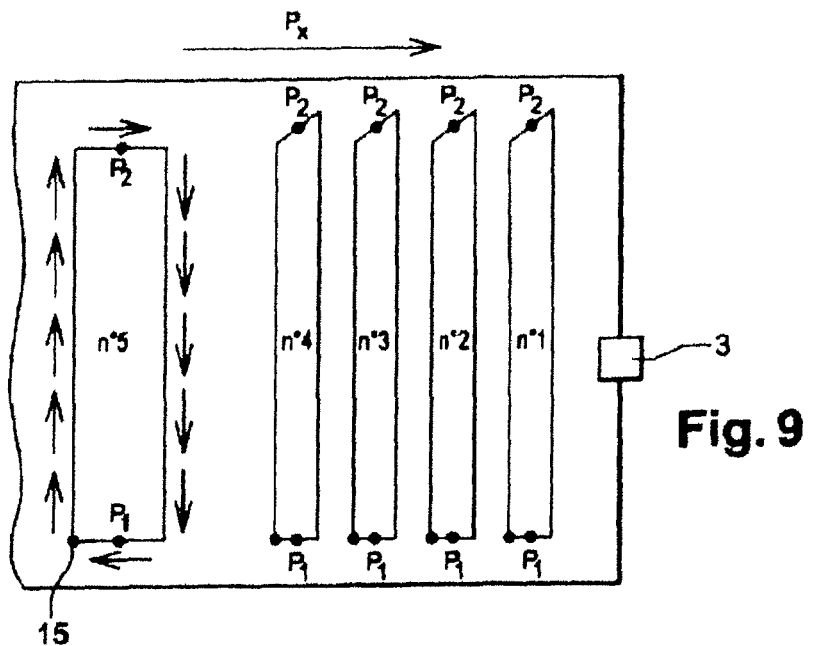
FIG. 9 illustrates an example of a panoply of parts having elongated shapes which parts are each disposed in a vertical orientation.

FIG. 9 illustrates a "vertical set" disposed at the far right of a panoply of parts.

According to the disclosed embodiments, the progression of the cutting Px in a "vertical set" is oriented in the direction of increasing X-axis values in the coordinate system of the panoply. This difference in direction of the progression compared to that in a non-vertical set is due to the cutting rules, according to which the cutting of a part always terminates at the side supported by a maximum of material of non-cut parts, wherewith the last side to be cut should not be oriented toward the skeleton side, that is, the side comprising the voids left by the other parts previously cut. If, in a "vertical set", the progression of the cutting is in the negative X-direction, taking into account that the cutting of a part always begins at the lower left corner of each "vertical part" (15), the last side of the last "vertical part" to be cut (part no. 5 in FIG. 9) will then be oriented toward the skeleton side. If in this "vertical set" the cutting direction is reversed, then the last side of the last "vertical part" to be cut (part no. 1) will be the side held by a clamping arm 3.

Consequently, in general a "vertical set" disposed at the extreme right or extreme left of the panoply is always cut first.

Figure 10:
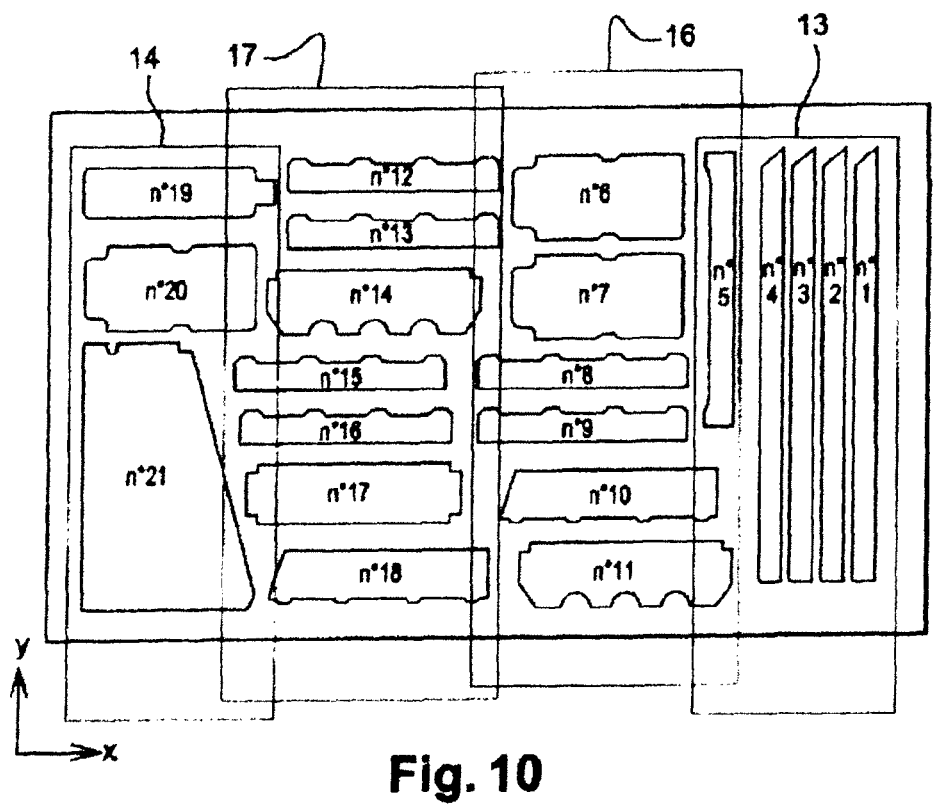
FIG. 10 illustrates an example of a panoply of parts comprised of one "vertical set" and three rectangular subsets.

FIG. 10 illustrates an example of a panoply of parts (nos. 1 to 21), illustrating all of the steps of grouping in the inventive method.

In a first step, the covering index $\beta$ is set equal to 0.65; it is then found that the panoply has three ordinary subsets and five "vertical subsets" each of said vertical subsets comprising a single "vertical part", no. 1 to no. 5, respectively. The first reference subset, 16, is comprised of parts no. 6 to no. 11; the second reference set, 17, is comprised of parts no. 12 to no. 18; and the third reference set, 14, is comprised of parts no. 19 to no. 21.

In a second step of the process, the three ordinary subsets are grouped to form one set, and the five "vertical subsets" are grouped to form one "vertical set", 13 (FIG. 10).

The cutting order will thus depend on the value of the parameter super-$\beta$. The two extreme cases are super-$\beta$=1 and super-$\beta$=0.

If super-$\beta$ is chosen equal to 0, the entire panoply of parts is deemed to be a single set. The cutting order will then be as follows:

The "vertical set" is cut first, in the positive X direction, i.e. in the order of parts no. 5 to no. 1; then The parts in the set are cut in rows.

In the second extreme case, super-β chosen equal to 1, the cutting order of the panoply is established considering only the subsets organized in columns, and the five "vertical subsets".

The vertical parts are cut first, in the positive X direction, i.e. in the order of parts no. 5 to no. 1; then the cutting order begins at the first column of parts, namely subset 16, followed by the second column, corresponding to subset 17, and then the third column, corresponding to subset 14. In each column, the parts are cut in order from top to bottom (negative Y direction), in conformity with the cutting rule that the cutting should always terminate at a side which is directed toward the line of workholders.

Advantageously, this cutting process is integrated into a cutting program via an algorithm. A processor uses this cutting program to automatically determine the cutting order depending on the parameters of a given panoply, and the cutting order thus determined is communicated to the control system for guiding the advancement of the cutting tool. The direction of progression of the cutting in the negative X direction is specified manually by the operator at the start of the cutting process.

The iterative sequence is semi-automatic, with the number of iterations being specified by the operator, who judges whether the level of discretization of the panoply is sufficient to produce a cutting order. Thus the operator indicates when the iterative sequence is to be terminated.

In a different embodiment, the values of the "weighting parameters" may be partially set by the preparer, wherewith the cutting order will then be established semi-automatically. This semi-automatic mode may be useful for setting the parameters with the aid of direct observations of the panoply prior to an adjustment for operation in semi-automatic mode.

In general, the cutting process employed comprises cutting by high speed machining, with the plates in a configuration with minimum support.

The invention claimed is:

1. A method of cutting out a panoply of parts, comprising:
   generating data defining a contour and position of each part as a set of cartesian coordinates defined as X along an x-axis and Y along a y-axis, of the panoply;
   iteratively performing the following steps until each part of the panoply of parts has been grouped in a subset:
   identifying an ungrouped principle part having a longest X axis dimension and a largest Y coordinate;
   defining a covering zone extending in a negative Y direction from the ungrouped principle part and extending between a smallest and largest X coordinate of the ungrouped principle part; and
   grouping other ungrouped parts disposed at least partially within the covering zone with the ungrouped principle part to form a subset when the other ungrouped parts have a predetermined amount of disposition within the covering zone specified by a covering index, B, having a value between 0 and 1;
   grouping subsets together having projection zones within a predetermined coincidence value when the predetermined coincidence value is specified by a superposition index, super-B, the subsets grouped together forming a set;
   establishing an order of cutting out the parts from the subsets and sets; and
   moving a cutting tool from part to part in accordance with the established order of cutting the parts.

2. A method of cutting out a panoply of parts according to claim 1; wherein the steps iteratively performed until each part of the panoply of parts has been grouped in a subset, and the step of grouping subsets together having projection zones within a predetermined coincidence value, are part of a semi-automatic iterative process.

3. A method of cutting out a panoply of parts according to claim 1; comprising using a concavity parameter γ, having a value between 0 and 1, to classify the contour of each part as rectangular or arcuate.

4. A method of cutting out a panoply of parts according claim 1; wherein the order of cutting out the parts is determined from the superposition index, super-β.

5. A method of cutting out a panoply of parts according to claim 1; wherein the superposition index, super-β, comprises a value between 0 and 1.

6. A method of cutting out a panoply of parts according to claim 5; wherein, if the superposition index, super-β, has a value of 1, the order of cutting out the parts is defined solely by the parts grouped into subsets.

7. A method of cutting out a panoply of parts according to claim 5; wherein, if the superposition index, super-β, has a value of 0, the order of cutting out the parts is defined solely by parts organized in rows.

8. A method of cutting out a panoply of parts according to claim 7; wherein the rows comprise single rows.

9. A method of cutting out a panoply of parts according to claim 7; wherein the rows comprise double rows.

10. A method of cutting out a panoply of parts according to claim 1; wherein the order of cutting out the parts is oriented in negative-direction along the x-axis.

11. A method of cutting out a panoply of parts according to claim 1; comprising:
    identifying elongated parts which are disposed along the y-axis; and
    grouping the identified elongated parts in a vertical set.

12. A method of cutting out a panoply of parts according to claim 11; wherein, the order of cutting out the parts of the vertical set is determined in a positive direction along the x-axis.

13. A device for cutting out a panoply of parts comprising the cutting tool of claim 1 controlled by a control system running a non-transitory cutting program, the cutting program implementing the method of cutting out a panoply of parts according to claim 1.

* * * * *